(No Model.)

B. F. BADGER.
RAZOR STROP.

No. 312,603. Patented Feb. 24, 1885.

Witnesses.
H. E. Morse
E. Planta

Inventor.
B. F. Badger
by J. H. Adams
Attorney.

UNITED STATES PATENT OFFICE.

BENJAMIN F. BADGER, OF CHARLESTOWN, MASSACHUSETTS.

RAZOR-STROP.

SPECIFICATION forming part of Letters Patent No. 312,603, dated February 24, 1885.

Application filed March 14, 1884. (No model.)

*To all whom it may concern:*

Be it known that I, BENJAMIN F. BADGER, a citizen of the United States, residing at Charlestown, in the county of Suffolk and State of Massachusetts, have invented a new and useful Improvement in Razor-Strops, of which the following is a specification.

My invention relates to an improvement in that class of razor-strops in which a single strap or band of leather is used, said band extending around two sides of the stock or body of the strop lengthwise, the ends being secured to the outer end of the stock and the band being tightened by means of a screw and nut on turning the handle. It is very essential in strops of this kind that the leather band be prevented from changing its position laterally or become twisted by the turning of the screw in tightening the band, and to this end various devices have been employed—such as metal wire guides, &c.—which add materially to the expense of the strop.

It is my object to overcome the objections in this class of strops, and to construct a simple, efficient, and comparatively inexpensive strop.

The invention consists in the employment of a thin plate of wood or other suitable material set within a recess in the handle end of the stock, and extending out at each side of the same, and of a length equal to width of the band, in combination with a nut composed of a metal plate of a length less than that of the longest dimension of the fixed plate on the stock.

Figure 1:
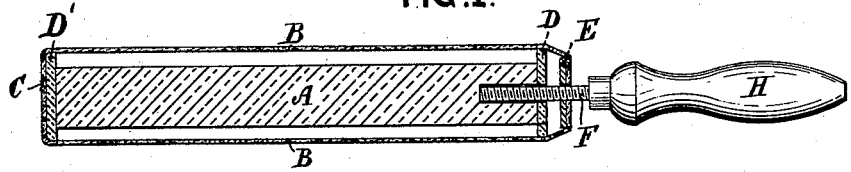
Figure 2:
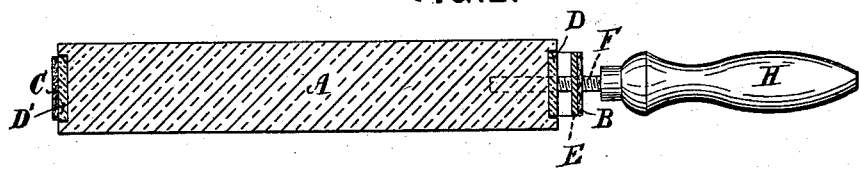
Figure 3:
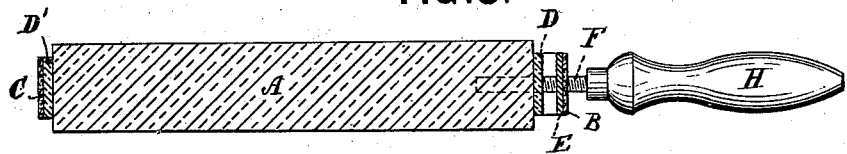
Figure 4:
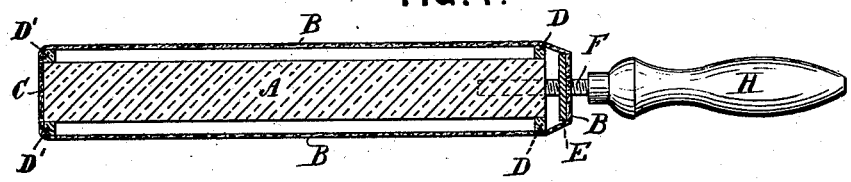

Referring to the accompanying drawings, Figure 1 is a longitudinal section of a strop through the body and the belt. Fig. 2 is a section through the sides not covered by the belt. Fig. 3 is a similar view, showing the plate or bridge secured to the outer end of the stock. Fig. 4 shows separate bearings on the sides of the ends of the body, over which the belt passes.

A represents the body or stock of the strop. B is the belt or band passing lengthwise over two sides of the strop-body, around the nut E, and fastened at the ends at C to the outer end of the body A. F is a screw attached to a handle, H, and passing through the nut E and band B. It also passes through a plain hole in the plate D and into a cavity in the body A, the lower end of which cavity is a bearing for the end of the screw F, by which means the handle and body of the strop are held firmly together. The plate D constitutes a bearing for the strap or band B, and is sunk in a recess in the front or handle end of the strop-body, as indicated in Fig. 2, and projects outward on each side, as shown in Fig. 1, and is of the same length as the band B. The said bearing may consist in any of the devices shown. The plate E, constituting a nut on the screw F, is shorter than the plate D, so that the band or strap B inclines from the plate D to the nut E, as shown in Figs. 1 and 5, and so that as the screw and handle are turned to tighten or loosen the belt the latter will be drawn evenly over the plate or bridge D without the liability of being twisted or turned to one side.

In Figs. 1 and 2 the plate D is shown as sunk in a recess in the front end of the body A. The same is shown at D' at the outer end of the body.

In Fig. 3 the plate D is shown as secured to the extreme inner or handle end of the body, and also at the outer end, D'.

In Fig. 4 are shown cleats or bridges secured to the outer sides of the ends of the body A.

What I claim as my invention is—

A razor-strop composed of a body, A, having a cavity at the handle end, the bottom of which forms a bearing for the end of the screw F, the perforated band-bearing D, the nut E, the belt B, the screw F, and handle H, all as shown and described.

In testimony whereof I have signed my name to this specification in the presence of two subscribing witnesses.

BENJ. F. BADGER.

Witnesses:
J. H. ADAMS,
HOWARD B. EMERSON.